(12) United States Patent
Reichard

(10) Patent No.: US 10,645,873 B2
(45) Date of Patent: May 12, 2020

(54) GRASS MOWER

(71) Applicant: KUBOTA CORPORATION, Osaka (JP)

(72) Inventor: Maxwell Reichard, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 543 days.

(21) Appl. No.: 14/960,829

(22) Filed: Dec. 7, 2015

(65) Prior Publication Data

US 2017/0156262 A1  Jun. 8, 2017

(51) Int. Cl.
*A01D 34/00* (2006.01)
*A01D 34/74* (2006.01)
*A01D 34/64* (2006.01)
*A01D 34/82* (2006.01)
*A01D 101/00* (2006.01)

(52) U.S. Cl.
CPC ............ *A01D 34/74* (2013.01); *A01D 34/64* (2013.01); *A01D 34/824* (2013.01); *A01D 2101/00* (2013.01)

(58) Field of Classification Search
CPC ...... A01D 34/74; A01D 34/64; A01D 34/824; A01D 2101/00
USPC .................................................. 56/17.1, 17.2
See application file for complete search history.

(56) References Cited

U.S. PATENT DOCUMENTS

| | | | | | |
|---|---|---|---|---|---|
| 5,351,467 | A | * | 10/1994 | Trefz | A01D 34/74 56/14.9 |
| 6,122,903 | A | * | 9/2000 | Hayashi | A01D 34/74 56/15.7 |
| 6,837,032 | B1 | * | 1/2005 | Swartzendruber | A01D 34/64 56/14.9 |
| 7,059,109 | B2 | * | 6/2006 | Samejima | A01D 34/64 56/17.1 |
| 7,448,191 | B2 | * | 11/2008 | Elhardt | A01D 34/74 56/17.1 |
| 7,770,370 | B2 | | 8/2010 | Komorida et al. | |

(Continued)

FOREIGN PATENT DOCUMENTS

EP  1 958 492  8/2008

OTHER PUBLICATIONS

Extendend European Search Report issued in Patent Application No. 16198183.2, dated May 17, 2017.

*Primary Examiner* — Thomas B Will
*Assistant Examiner* — Mai T Nguyen
(74) *Attorney, Agent, or Firm* — Greenblum & Bernstein, P.L.C.

(57) ABSTRACT

A grass mower includes a cutting height adjustment mechanism for adjusting a cutting height of a mower unit via a lift link mechanism. The cutting height adjustment mechanism has a cutting height control grip disposed upwardly of the fender unit and on one outer side of the driver's seat in the vehicle body transverse direction, a cam body disposed downwardly of the fender unit and closer to a center of the vehicle body in the vehicle body transverse direction than the cutting height control grip, a rotational rod extending obliquely through the fender unit and connecting the cutting height control grip with the cam body, and a stopper body for selectively determining a cutting height of the mower unit in association as it comes into contact with one of a plurality of contact faces formed in the cam body.

7 Claims, 11 Drawing Sheets

(56) References Cited

U.S. PATENT DOCUMENTS

| | | | | |
|---|---|---|---|---|
| 8,756,903 B2* | 6/2014 | Walden | ............... | A01D 34/662 |
| | | | | 56/15.8 |
| 9,693,501 B2* | 7/2017 | Giere | .................... | A01D 34/74 |
| 2006/0090442 A1 | 5/2006 | Komiya et al. | | |
| 2007/0169456 A1 | 7/2007 | Komorida et al. | | |
| 2008/0190087 A1 | 8/2008 | Elhardt et al. | | |
| 2009/0031687 A1 | 2/2009 | Elhardt et al. | | |

* cited by examiner

GRASS MOWER

TECHNICAL FIELD

The present invention relates to a grass mower having a cutting height adjustment mechanism for adjusting a cutting height of a mower unit which is suspended from a traveling vehicle body via a lift link mechanism.

BACKGROUND ART

U.S. Pat. No. 6,122,903 discloses a mower configured such that a mower unit is suspended from a vehicle body frame via a link mechanism, the mower unit is raised/lowered in association with a pivotal movement of a lift control lever, and lowering of the mower unit is limited by a "descent restrictor", thereby to allow adjustment of the cutting height. In this, the cutting height adjustment is possible in multiple steps by a rotational operation of the descent restrictor. A grip of the lift control lever and a knob for rotatably operating the descent restrictor are disposed downwardly of a front end of a driver's seat. Therefore, when a driver seated at a driver's seat is to operate the lift control lever and the knob of the descent restrictor, the driver needs to bend his/her body deeply, so that considerable stress is given to his/her body.

U.S. Pat. No. 7,770,370 discloses a mower configured such that a mower unit is suspended from a vehicle body frame via a link mechanism, the mower unit is raised/lowered by a hydraulic cylinder, and a lower limit setting means limits lowering of the mower unit, thereby to allow adjustment of the cutting height. The adjustment of the cutting height which is possible in multiple steps is done by a dial that is disposed downwardly of a front end of a driver's set. Therefore, with this mower too, when a driver seated at the driver's seat is to operate the dial for cutting height adjustment, stress is given to the driver's body.

SUMMARY OF INVENTION

This is a demand for a grass mower that allows cutting height setting without giving significant stress to a body of a driver seated at a driver's seat.

A grass mower relating to the present invention comprises: a traveling vehicle body; a mower unit; a driver's seat disposed at a center in a transverse direction of the vehicle body and at an upper portion of the vehicle body; a fender unit including a left fender, a right fender and a seat attaching portion; a lift link mechanism supporting the mower unit downwardly of the traveling vehicle body with allowing raising and lowering of the mower unit; and a cutting height adjustment mechanism for adjusting a cutting height of the mower unit by the lift link mechanism. This cutting height adjustment mechanism includes a cutting height control grip, a cam body, a rotational rod, and a stopper. The cutting height control grip is disposed upwardly of the fender unit and on one outer side of the driver's seat in the vehicle body transverse direction. The cam cam body is disposed downwardly of the fender unit and closer to a center of the vehicle body in the vehicle body transverse direction than the cutting height control grip. The rotational rod extends obliquely through the fender unit and connects the cutting height control grip with the cam body. The stopper body selectively determines a cutting height of the mower unit in association as it comes into contact with one of a plurality of contact faces formed in the cam body.

With the above-described configuration, the cutting height control grip configured to adjust the cutting height in association with displacement of the cam body via the rotational rod is positioned on the left outer side or right outer side of the drive's seat, that is, adjacent the left hand or right side of the driver seated at the driver's seat. Therefore, the driver need not bend his/her body and can obtain comfortable operability in the cutting height adjustment. In addition, as the stopper body and the cam body which cooperate to set a cutting height in association with contact therebetween at a particular position are disposed downwardly of the fender unit and close to the vehicle body center, these stopper and cam bodies can be disposed at a free space where no problem of interference with a wheel or an axle can occur.

With the above-described arrangement of the cutting height adjustment mechanism, since the rotational rod extends obliquely with a slope relative to the perpendicular line, the rotational axis of the cam body too is sloped. For this reason, preferably, the cam body comprises a cup-shaped cone, the plurality of contact faces are formed in a bottom circumference face of the cone, and an extending direction of a generating line of the cone extending through a contact point between the respective contact face and the stopper body is in alignment with an extending direction of a force action line between the contact face and the stopper body. With this arrangement, the action line of the force received by the stopper body (based on the weight of the mower unit) is in alignment with the generating line of the conically shaped cam body. Accordingly, whichever contact face the stopper body may come into contact with, the contact state between the stopper body and the cam body is stable, so that a ground height of the mower unit can be maintained in a reliable manner by the stopper body and the cam body.

EMBODIMENTS

Figure 1:
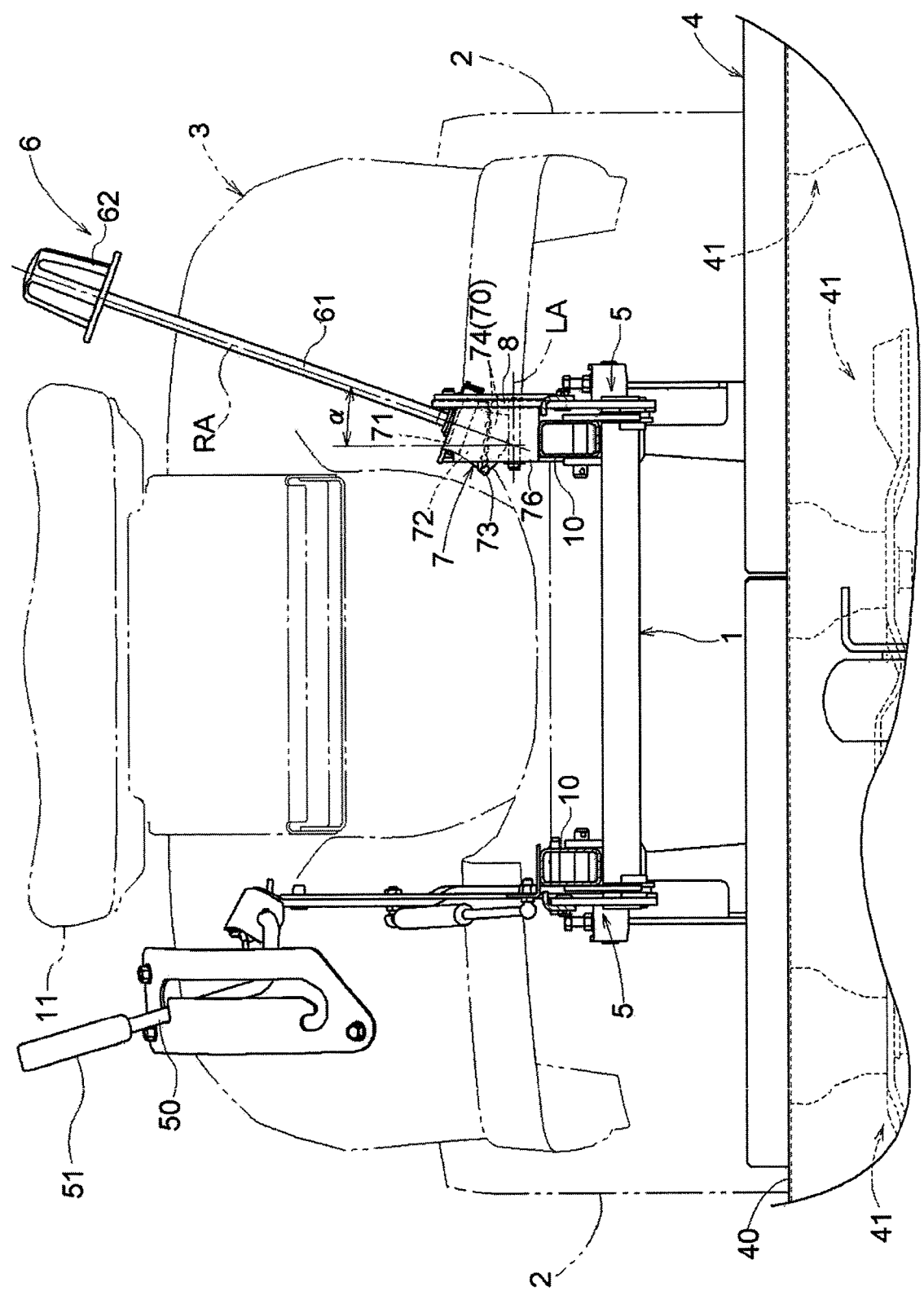
FIG. 1 is a diagram showing a basic configuration for cutting height adjustment employed in a grass mower according to the present invention.

Before a specific embodiment of a grass mower according to the present invention is explained, with reference to FIG. 1 and FIG. 2, there will be explained a basic configuration for a cutting height adjustment employed in the grass mower according to the present invention. The grass mower schematically shown in FIG. 1 includes a wheel unit 2 consisting of front wheels and rear wheels and a traveling vehicle body 1 supported on the ground by this wheel unit 2. The traveling vehicle body 1 includes a pair of left and right frames 10 extending along the front-rear direction of the vehicle body. And, a mower unit 4 is suspended from these frames 10 via lift link mechanisms 5. A driver's seat 11 is mounted on the top face of a fender unit 3.

Incidentally, in this embodiment, the direction along a vehicle body centerline of the grass mower (traveling direction) will be referred to as a vehicle body front-rear direction or simply as a front-rear direction. Also, the direction along a vehicle body width will be referred to as a vehicle body transverse direction, or simply as a transverse direction or left-right direction (right side, left side). The perpendicular direction relative to the ground surface may be referred to also as a vertical direction (upper side, lower side).

Configuration of the lift link mechanism 5 is well-known. And, one example thereof is disclosed in the U.S. Pat. No. 6,122,903 mentioned above. When a lift control lever 50 is raised, the mower unit 4 is raised toward the frame 10. When the lift control lever 50 is lowered, the mower unit 4 due to the weight of this unit 4 will be lowered toward the ground surface. A cutting height adjustment mechanism 6 sets a cutting height of the mower unit 4 by limiting lowering of the mower unit 4.

The cutting height adjustment mechanism 6 includes a rotational rod 61, a cutting height control grip 62, a cam body 7, and a stopper body 8. The stopper body 8 comprises a link structure operably connected with the lift link mechanism 5. In operation, when movement of the stopper body 8 is limited, movement of the lift link mechanism 5 too is limited, thus disabling any further lowering of the mower unit 4. As shown in FIG. 2, the cam body 7 defines a plurality of contact faces 70 in the form of stairway which come into contact with the stopper body 8. Depending on which contact face the stopper body 8 comes into contact with, a displacement limit position of the stopper body 8 will be different. That is, with selection of the contact face to come into contact with the stopper body 8, the mower unit 4 can be set to a desired lowered position (cutting height).

The cam body 7 comprises a rotational body configured such that in association with its rotation about a rotational axis RA, the contact face 70 to come into contact with the stopper body 8 will vary. The cam body 7 disposed downwardly of the fender unit 3 is operably connected with a rotational rod 61 which extends through the fender unit 3 along the rotational axis RA. To the other end of the rotational rod 61 disposed upwardly of the fender unit 3, the cutting height control grip 62 is attached. This cutting height control grip 62 is disposed on the outer side of the driver's seat 11, i.e. on the left side in the FIG. 1 illustration. The height of the cutting height control grip 62 is substantially same as a height of a seat cushion of the driver's seat 11, so that this grip 62 can be easily operated by a left hand of a driver seated at the driver's seat 11. The cam body 7 is disposed closer to the vehicle body center than the cutting height control grip 62 in the vehicle body transverse direction. In the example shown in FIG. 1, the cam body 7 is located on the inner side of the left wheel in the vehicle body transverse direction and substantially under the left end of the driver's seat 11. Therefore, the rotational rod 61 extends such that the center axis of this rotational rod 61 extends with a slope angle $\alpha$ relative to the perpendicular line to the ground surface. The center axis of the rotational rod 61 is same as the axis of the rotational axis RA of the cam body 7.

Figure 2:
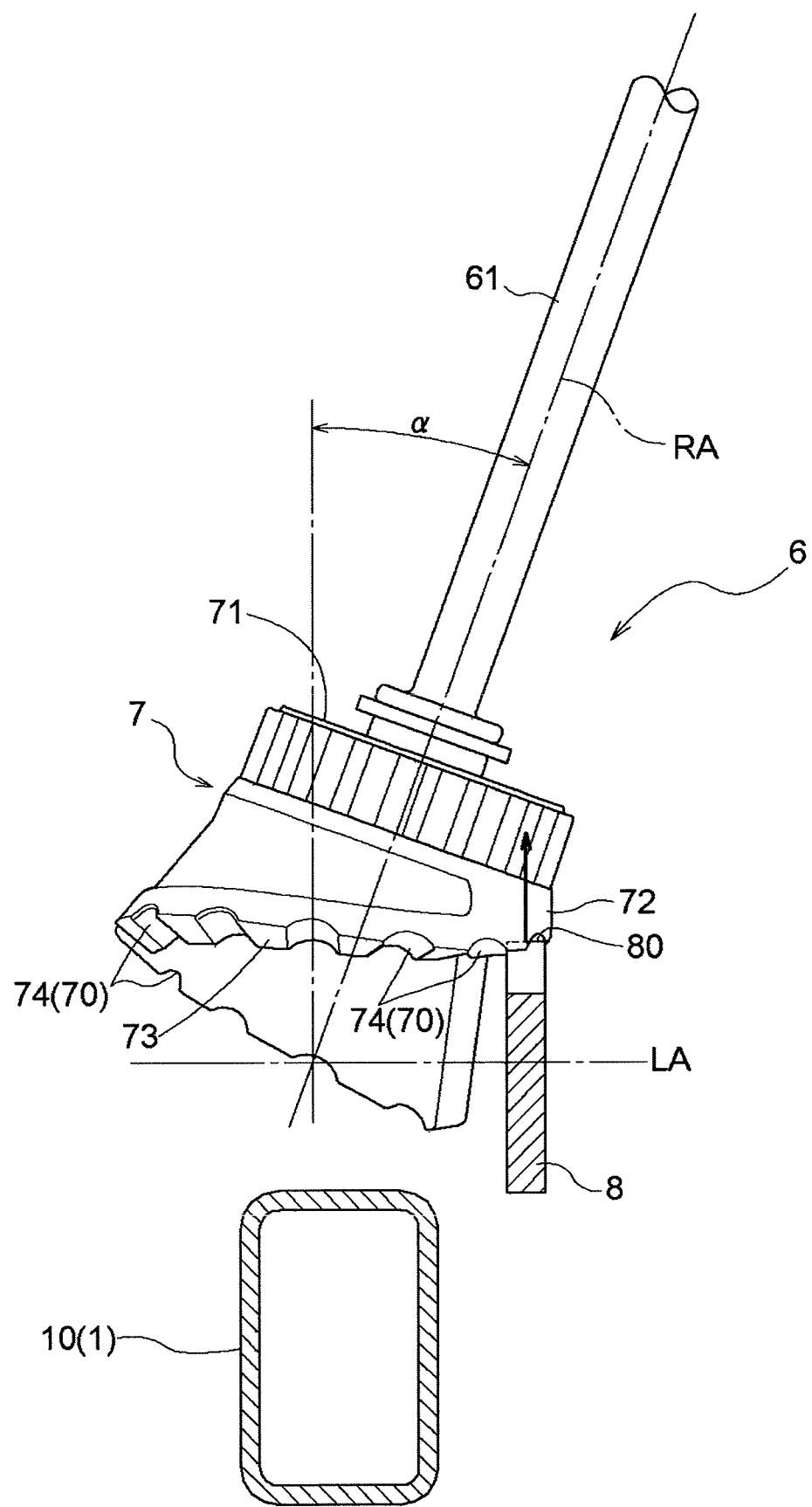
FIG. 2 is an explanatory view showing relation between a cam body and a stopper body which are included in the cutting height adjustment mechanism.

In the exemplary mode shown in FIG. 1 and FIG. 2, the cam body 7 comprises a cup-shaped cone. More particularly, the cam body 7 consists essentially of a top wall 71 and a side wall 72, and a bottom face 73 of the side wall 73 has a spiral shape. In this bottom face 73, there are formed many recesses 74 with a predetermined spacing therebetween. Each of these recesses 74 functions as the contact face 70 which comes into contact with an acting portion 80 of the stopper body 80.

The stopper body 8 is supported to the frame 10 to be pivotable about a lateral axis LA in operative connection with the lift link mechanism 5 in response to rising/lowering of the mower unit 4. As shown in FIG. 1 and FIG. 2, as seen in the front view, the cam body 7 is disposed in such a manner that a generating line of the side wall 72 of this cam body 7 is in approximate alignment with a plane of pivotal locus of the stopper body 8. With this, an extending direction of a force action line extending through the contact point (plane) located between the acting portion 80 of the stopper body 8 and the bottom face 73 of the cam body 7 in contact therewith is substantially in alignment with the generating line of the side wall 72 of the cam body 7 (generating line of the cone). This relationship is established whichever bottom face 73 the acting portion 80 may contact. And, the above arrangement allows the stopper body 8 and the cam body 7 to hold the mower unit 4 at a predetermined position in a stable manner.

As shown in FIG. 2, the slope angle ($\alpha$) of the center axes (the rotational axis RA) of the rotational rod 61 and the cam body 7 are determined such that the above-described force action line may be in the perpendicular direction.

In order to allow a cutting height set by the cutting height adjustment mechanism 6 to be maintained stably during grass mowing traveling of the mower unit 4 also, it is important that the cutting height adjustment mechanism 6 be held to the traveling vehicle body 1 in a secure manner. To this end, as shown in FIG. 1, it is preferred that the cam body 7 be overlapped with the frame 10 as seen in the plane view. With this arrangement, load applied to the cam body 7 can be transmitted smoothly to the frame 10, thus avoiding generation of unnecessary moment in the attaching members or the like. Further, it is also preferred that a support bracket 76 which pivotally supports the cam body 7 about the rotational axis RA and which also supports the stopper body 8 to be pivotally displaced about the lateral axis LA be mounted directly to the frame 10.

In the case of the example shown in FIG. 1, a lift control lever 50 for lifting up/down the mower unit 4 via the lift link mechanism 5 is disposed on the side opposite the cutting height adjustment mechanism 6 in the vehicle body transverse direction of the driver's seat 11, i.e. on the right side thereof in this example. Further, a lift control grip 51 attached to the upper end of the lift control lever 50 when located at its home position for maximally raising the mower unit 4 (uppermost position) is at the same height as the cutting height control grip 62 of the cutting height adjustment mechanism 6. That is, the lift control grip 51 and the cutting height control grip 62 are disposed in left-right symmetry relative to the driver's seat 11. With this layout, the lift control grip 51 can be operated readily by the right hand of a driver seated at the driver's seat 11.

Figure 3:
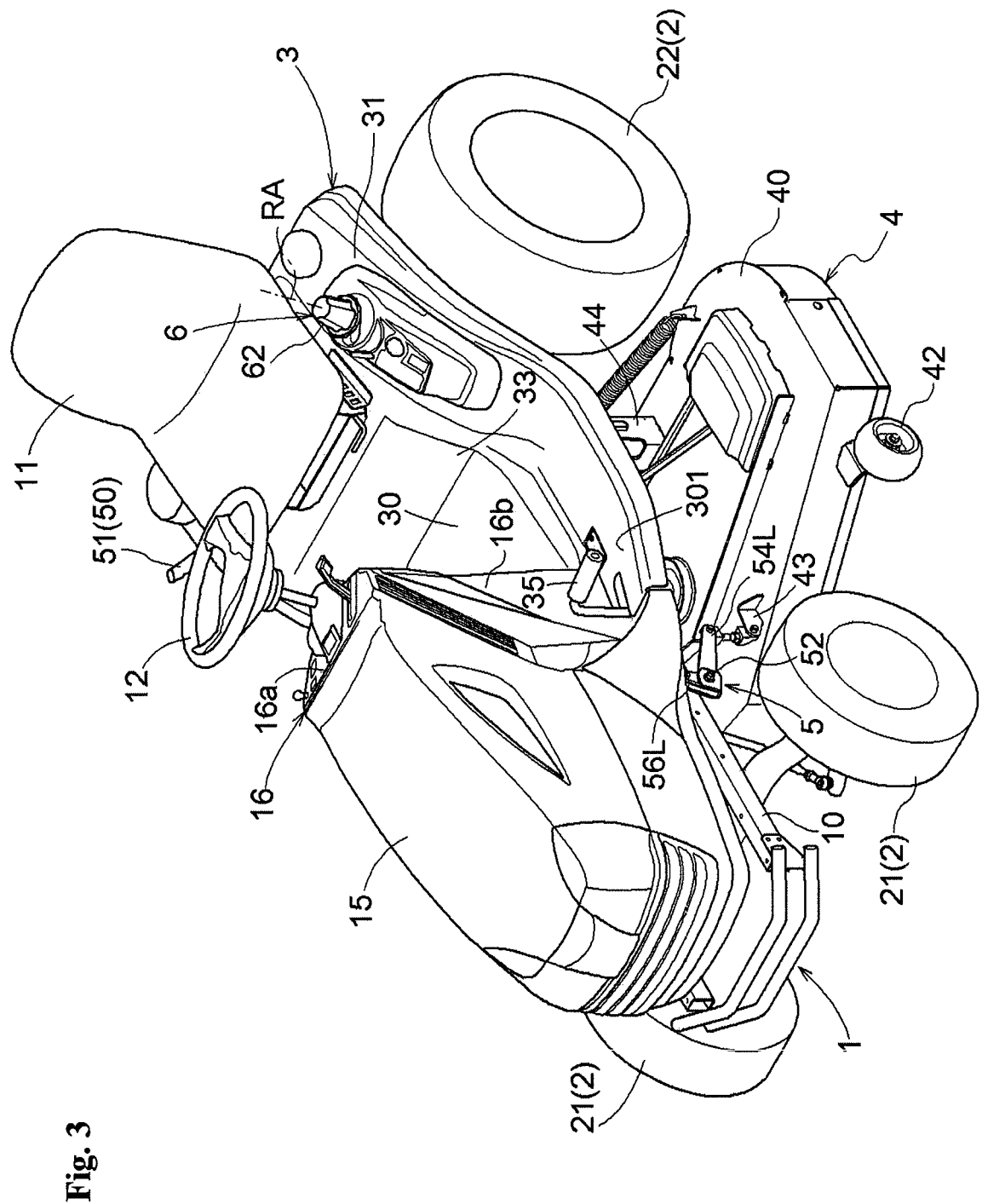
FIG. 3 is a perspective view of a grass mower as an embodiment of the present invention.
Figure 4:
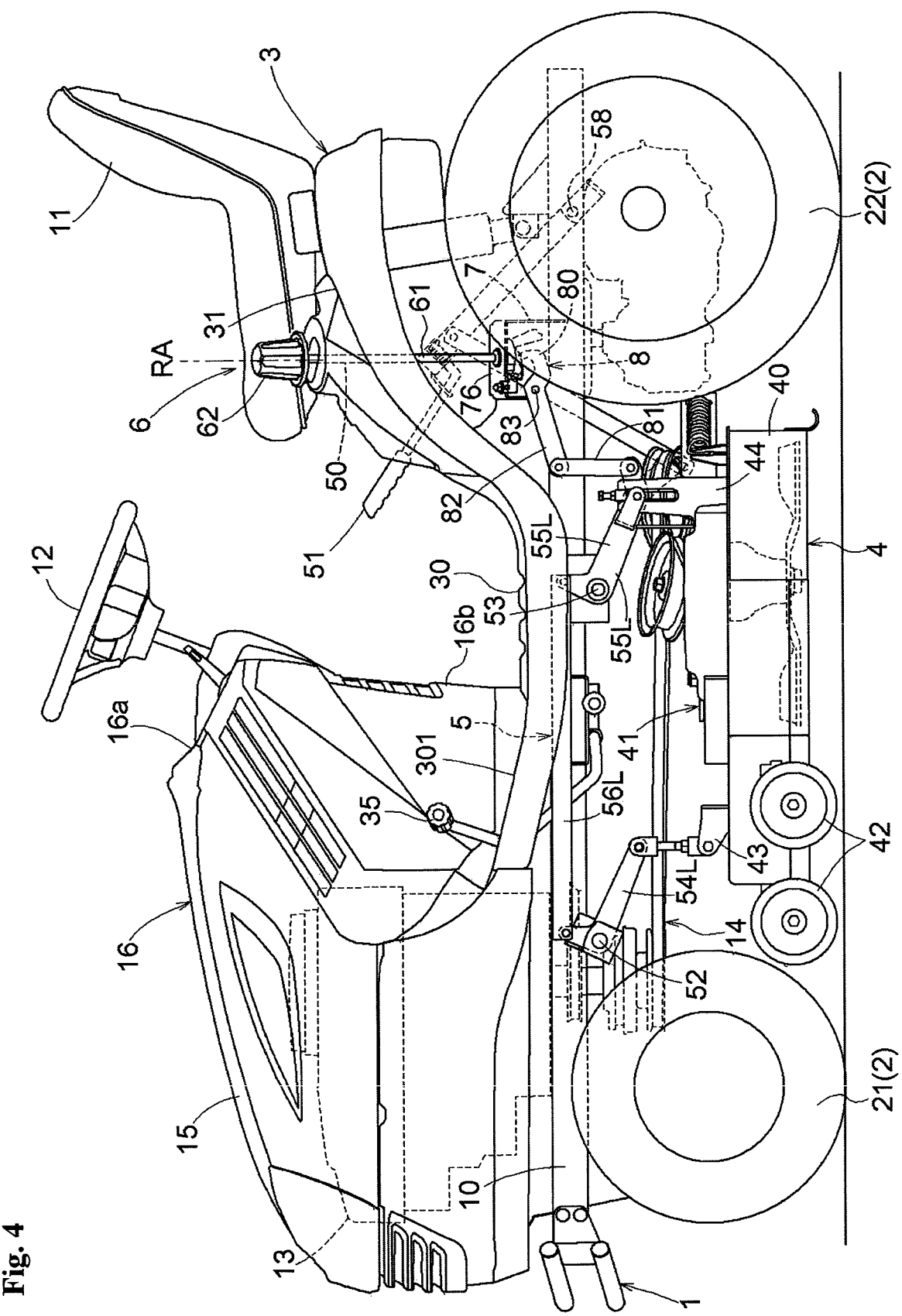
FIG. 4 is a side view of the grass mower as an embodiment of the present invention.

Next, with reference to the accompanying drawings, one specific embodiment of the grass mower according to the present invention will be explained. FIG. 3 is a perspective view of a riding mid-mount mower as an example of the grass mower. FIG. 4 is a side view and FIG. 5 is a plane view thereof.

Figure 5:
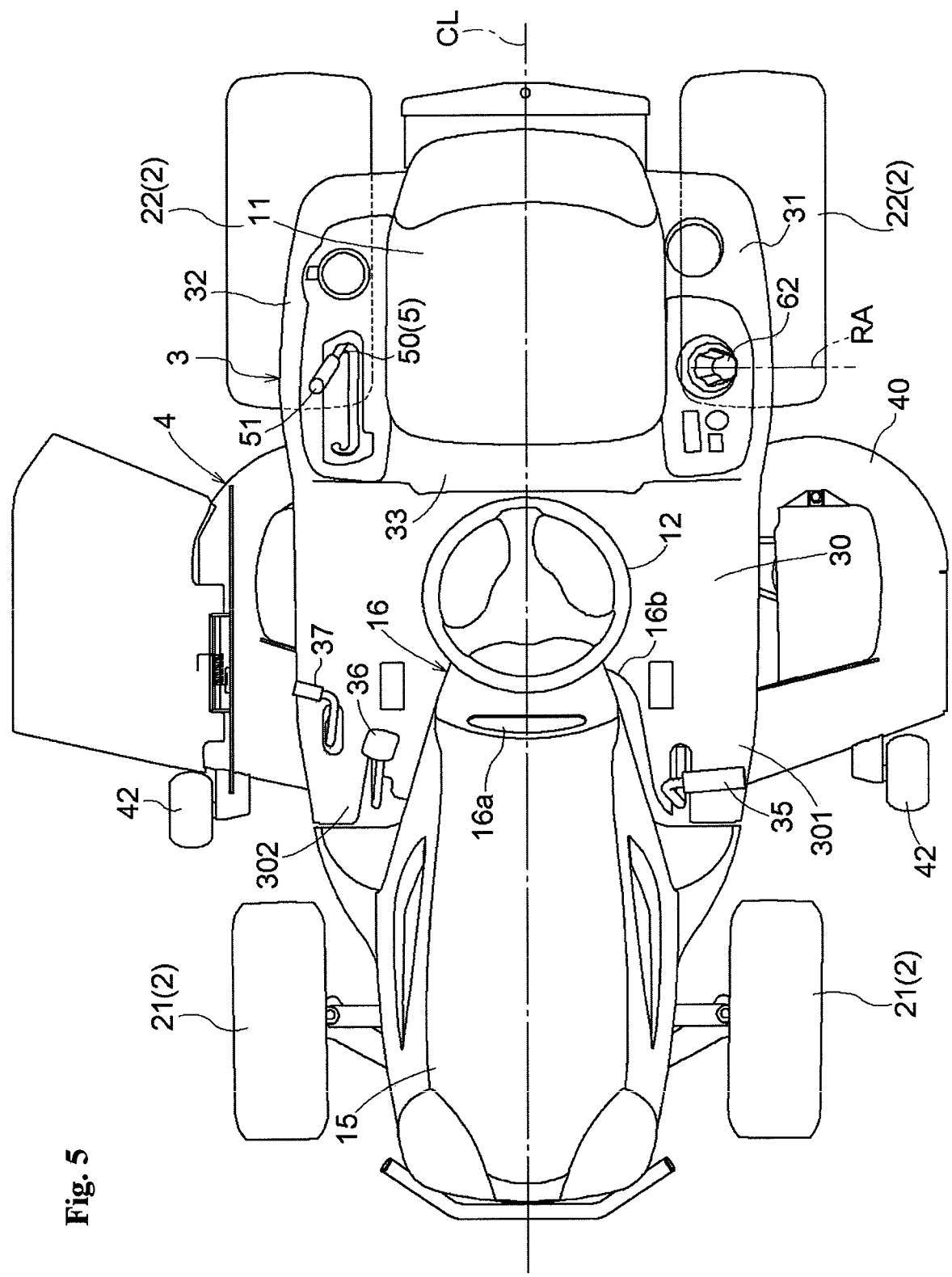
FIG. 5 is a plane view of the grass mower as an embodiment of the present invention.

This grass mower, as shown in FIG. 3, FIG. 4 and FIG. 5, includes a pair of left and right steerable front wheels 21, a pair of left and right drivable rear wheels 22, and the pair of left and right frames 10 which extend along the centerline in the vehicle body front-rear direction. And, the mower unit 4 is suspended via the lift link mechanisms 5 provided on the pair of left and right frames 10 between the front wheels 21 and the rear wheels 22.

An engine 13 is mounted to a front portion of the frames 10 (see FIG. 4), and a traveling power transmission mechanism (not shown) for transmitting power of this engine 13 to the rear wheels 22 extends along the vehicle body front-rear direction centerline CL. Further, an PTO (Power Take-Off) transmission mechanism 14 for transmitting power of the engine 13 to the mower unit 4 extends downwardly of the frames 10. The PTO transmission mechanism 14 receives power via an output shaft oriented forwardly of the vehicle body of the engine 13 and transmits this power to a blade drive unit 41 disposed upwardly of a mower housing 40 of the mower unit 4. The mower unit 4, in this embodiment, includes, inside the mower unit 40 thereof, a single blade or plural blades (not shown) disposed side by side in the transverse direction and rotatably driven about vertical axes by the blade drive unit 41. At left and right front corner areas of the mower unit 40, there are provided ground-contacting gauge wheels 42. With this riding grass mower in operation, the mower effects grass cutting (mowing) operation for cutting lawn or grass while the mower travels with rotatably driving the blade(s) of the mower unit 4.

In this embodiment, the pair of left and right frames 10 comprise angular pipes extending in the front-rear direction across the vehicle body front-rear direction centerline CL therebetween and the rear portions thereof are connected to a speed changer device, a rear axle case constituting the traveling power transmission mechanism (not shown), thereby to increase their rigidity. Each frame 10 can be partially or entirely formed of a plate member.

At the front portions of the frames 10, the engine 13 is mounted and also a hood 15 which covers the opposed side faces and front faces of the engine 13 and other engine auxiliary devices is attached thereto. The rear opening of the hood 15 is covered by a panel body 16. This panel body 16 includes a meter panel 16a and a steering post cover 16b. In the upper face of the meter panel 16a, a display panel for displaying various driving information such as an engine speed, a vehicle speed, etc. and various control tools are disposed. The steering post cover 16b covers a steering post.

From the lower end region of the steering post cover 16b to the region of the driver's seat 11, a floor panel 30 such as one shown in FIG. 5 is placed over the frames 10. In this embodiment, the floor panel 30 is formed as a front half portion of the fender unit 3. Whereas, a left rear wheel fender portion 31 for the left rear wheel 22, a right rear wheel fender portion 32 for the right rear wheel 22, and a seat attaching portion 33 located between the left rear wheel fender portion 31 and the right rear wheel fender portion 32 together form a rear half portion of the fender unit 3.

Further, a left footrest portion 301 of the floor panel 30 secures a space for the left foot of the driver seated at the driver's seat 11 and a brake pedal 35 is disposed here (see FIG. 4). A right footrest portion 302 secures a space for the right foot of the driver seated at the driver's seat 11 and a forward traveling speed setting pedal 6 and a reverse traveling speed setting pedal 37 are disposed side by side in the transverse direction (see FIG. 5). Also, the left footrest portion 301 and the right footrest portion 302 extend with substantially constant width in the vehicle body transverse direction along the vehicle body front-rear direction. On the opposed sides of the driver's seat 11 of the left rear wheel fender portion 31 and the right rear wheel fender portion 32, manual control devices which are manually operated by the driver are disposed. In this embodiment, the rotational rod 61 of the cutting height adjustment mechanism 6 extends upwards through the left rear wheel fender portion 31 to the vicinity of the left side of the seat cushion of the driver's seat 11. To the leading end of the rotational rod 61, there is attached the cutting height control grip 62 formed as a cutting height adjusting dial. When the cutting height control grip 62 is rotated, the rotational rod 61 is rotated. The cutting height adjustment mechanism 6 in this case employs the basic configuration explained with reference to FIG. 1 and FIG. 2 above. The lift control lever 50 of the mower unit 4 extends upwards through the right rear wheel fender 32 to the vicinity of the right side of the seat cushion of the driver's seat 11. The lift control lever 50 is pivotable about a lateral axis and in response to its pivotal movement upwards rearwardly, the mower unit 4 is raised. In response to its pivotal movement downwards forwardly, the mower unit 4 is lowered.

Figure 6:
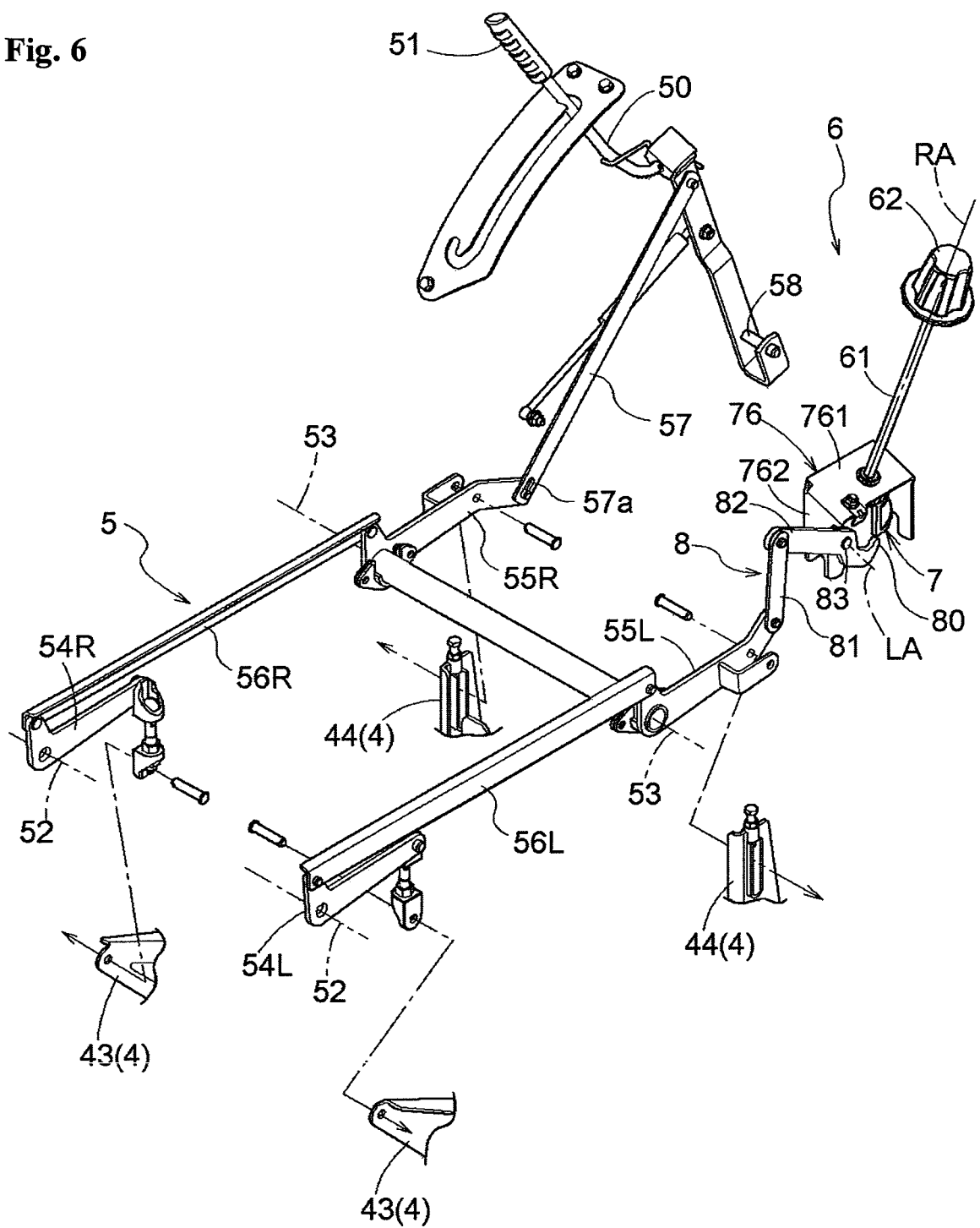
FIG. 6 is a diagram showing a link arrangement between the cutting height adjustment mechanism and a lift link mechanism.
Figure 7:
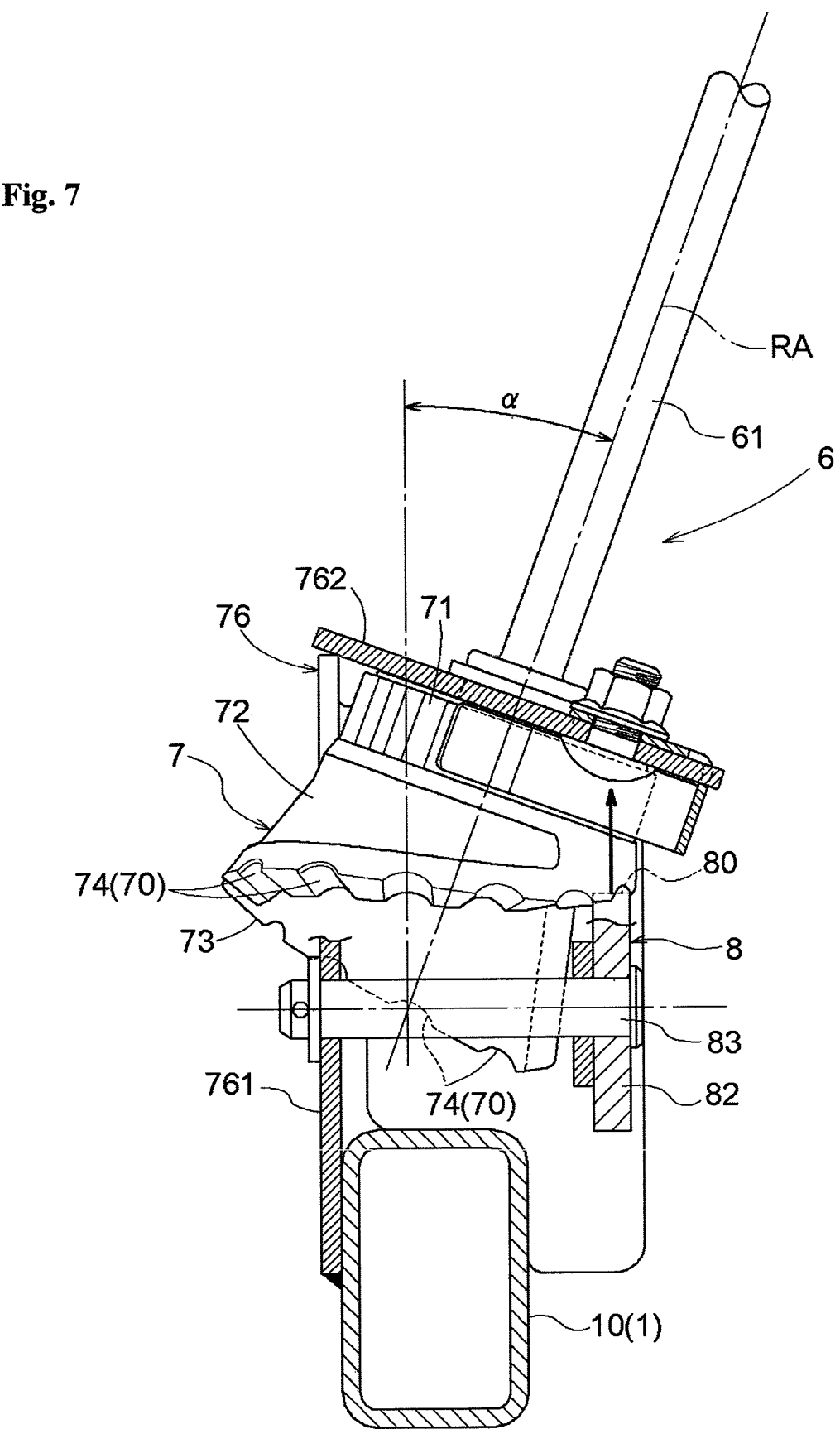
FIG. 7 is a front view of the cutting height adjustment mechanism.
Figure 8:
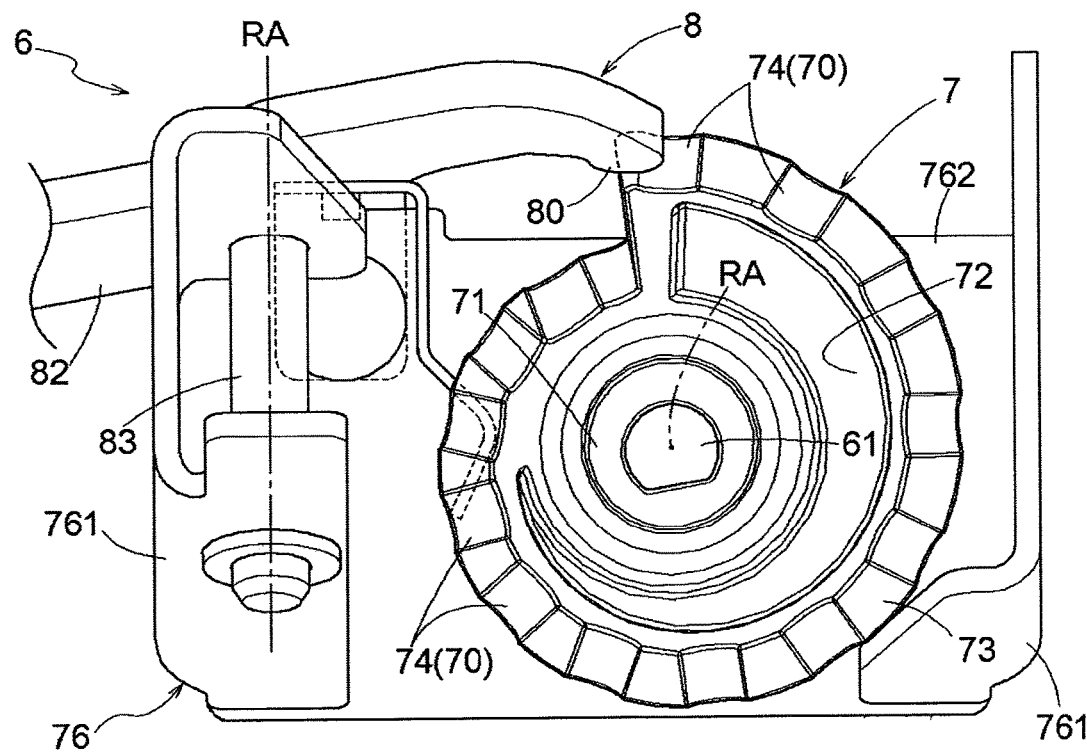
FIG. 8 is a bottom view showing the cam body and the stopper body which are included in the cutting height adjustment mechanism.
Figure 9:
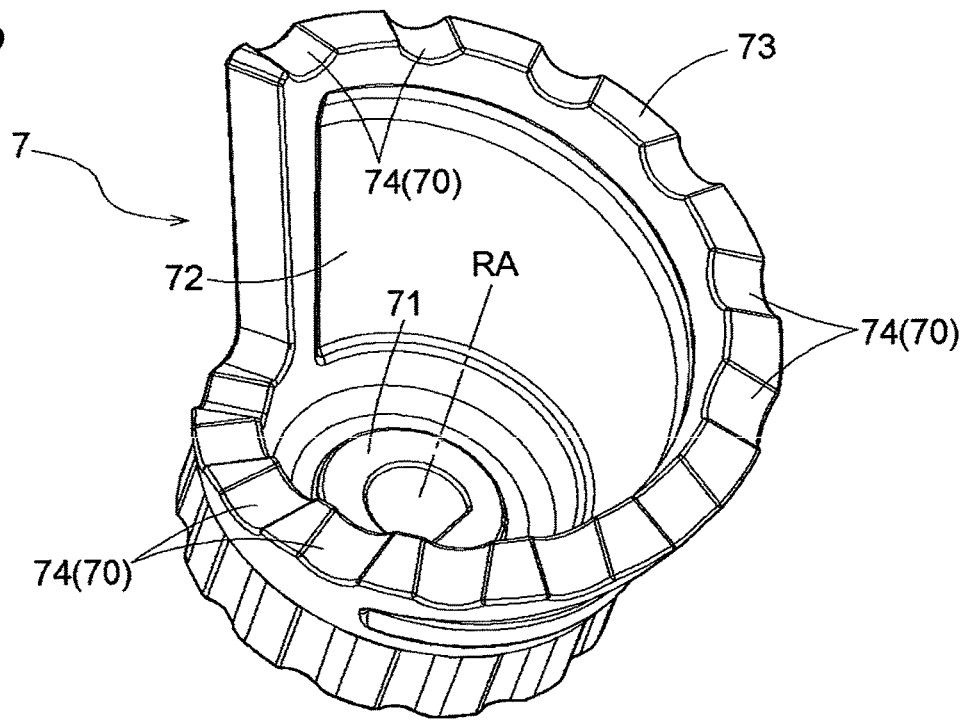
FIG. 9 is an enlarged perspective view of the cam body.
Figure 10:
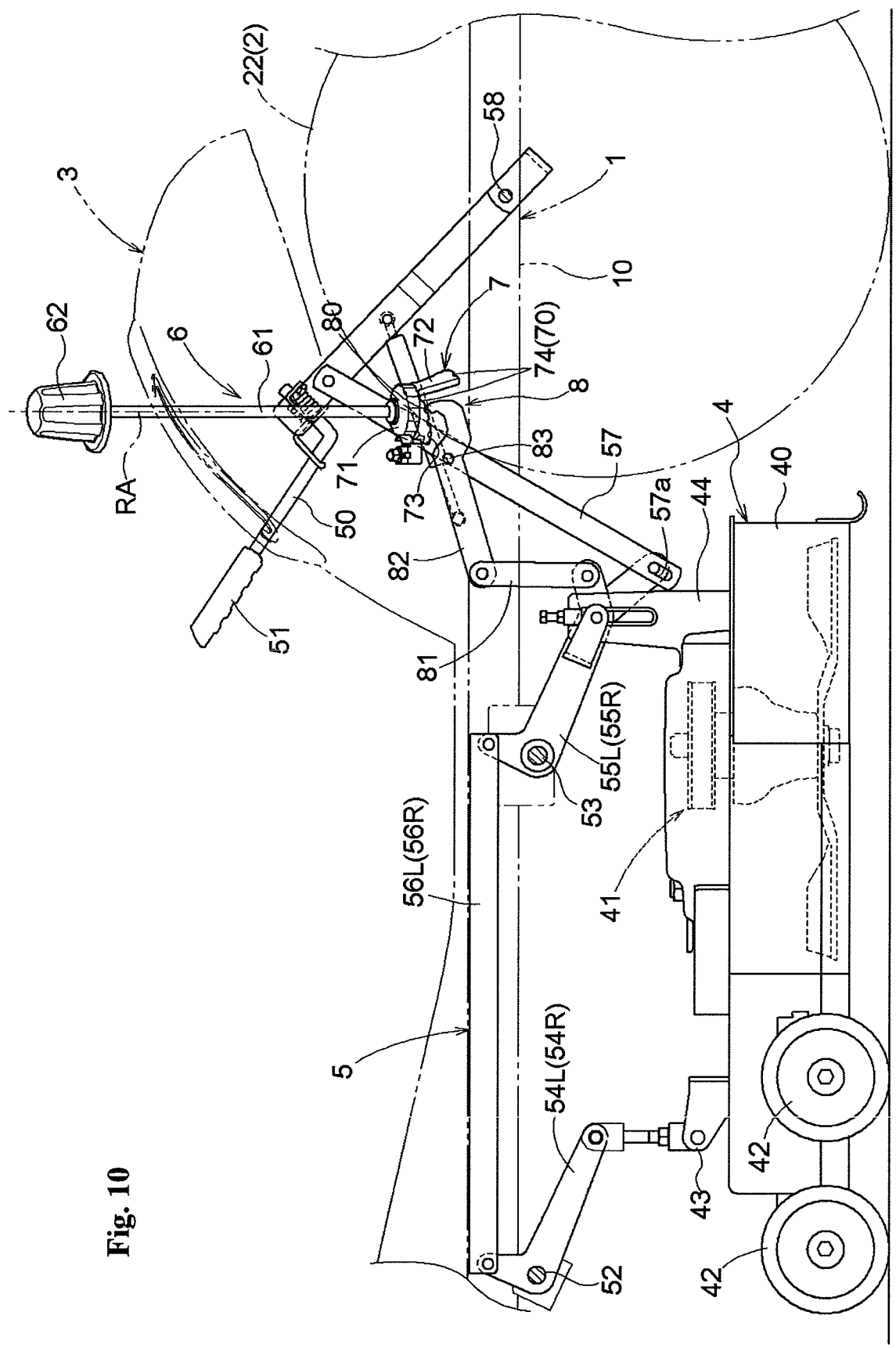
FIG. 10 is a side view showing a state of the lift link mechanism when the mower unit is lowered to the lowest height position.
Figure 11:
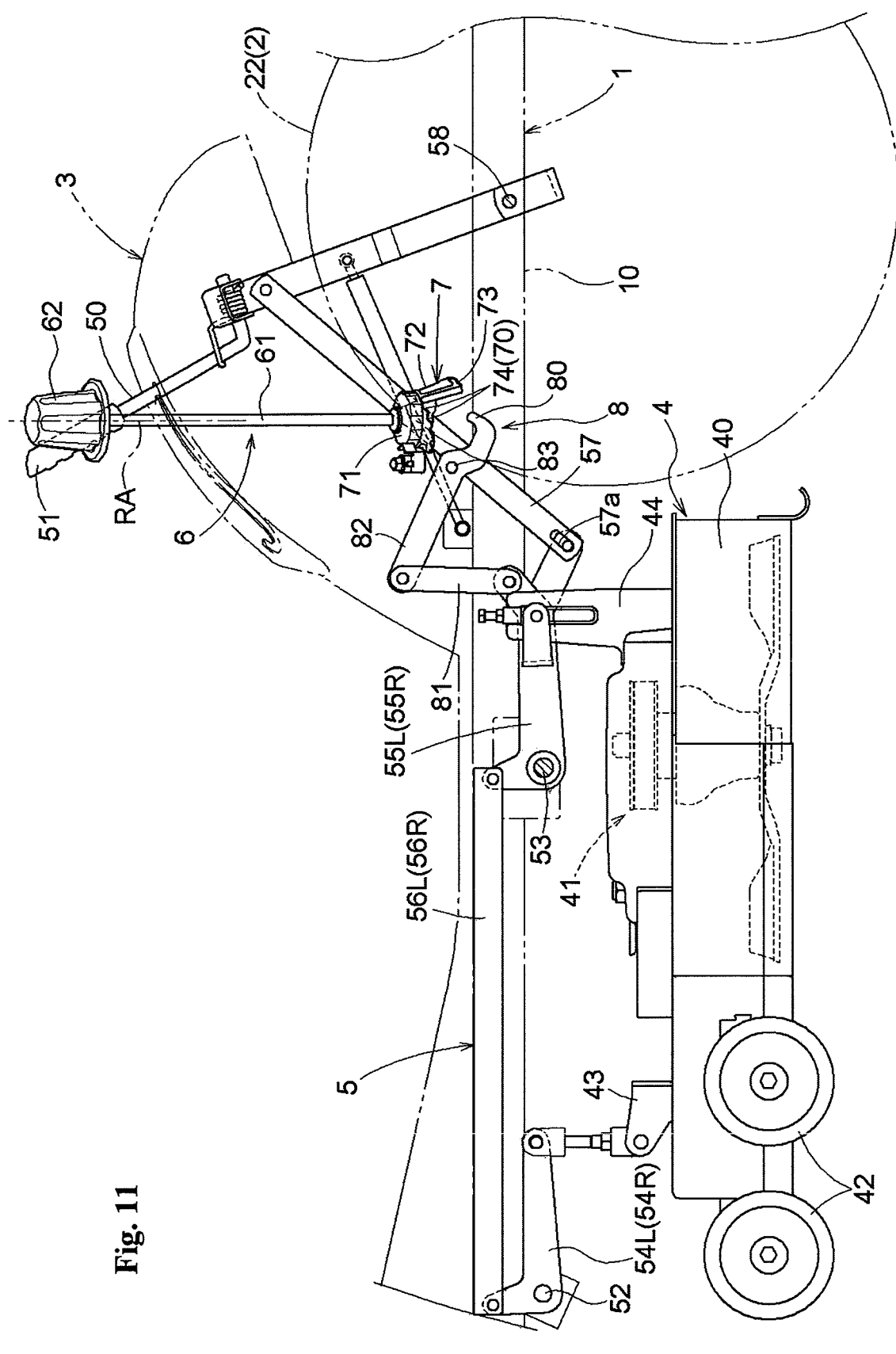
FIG. 11 is a side view showing a state of the lift link mechanism when the mower unit is raised to the highest height position.
Figure 12:
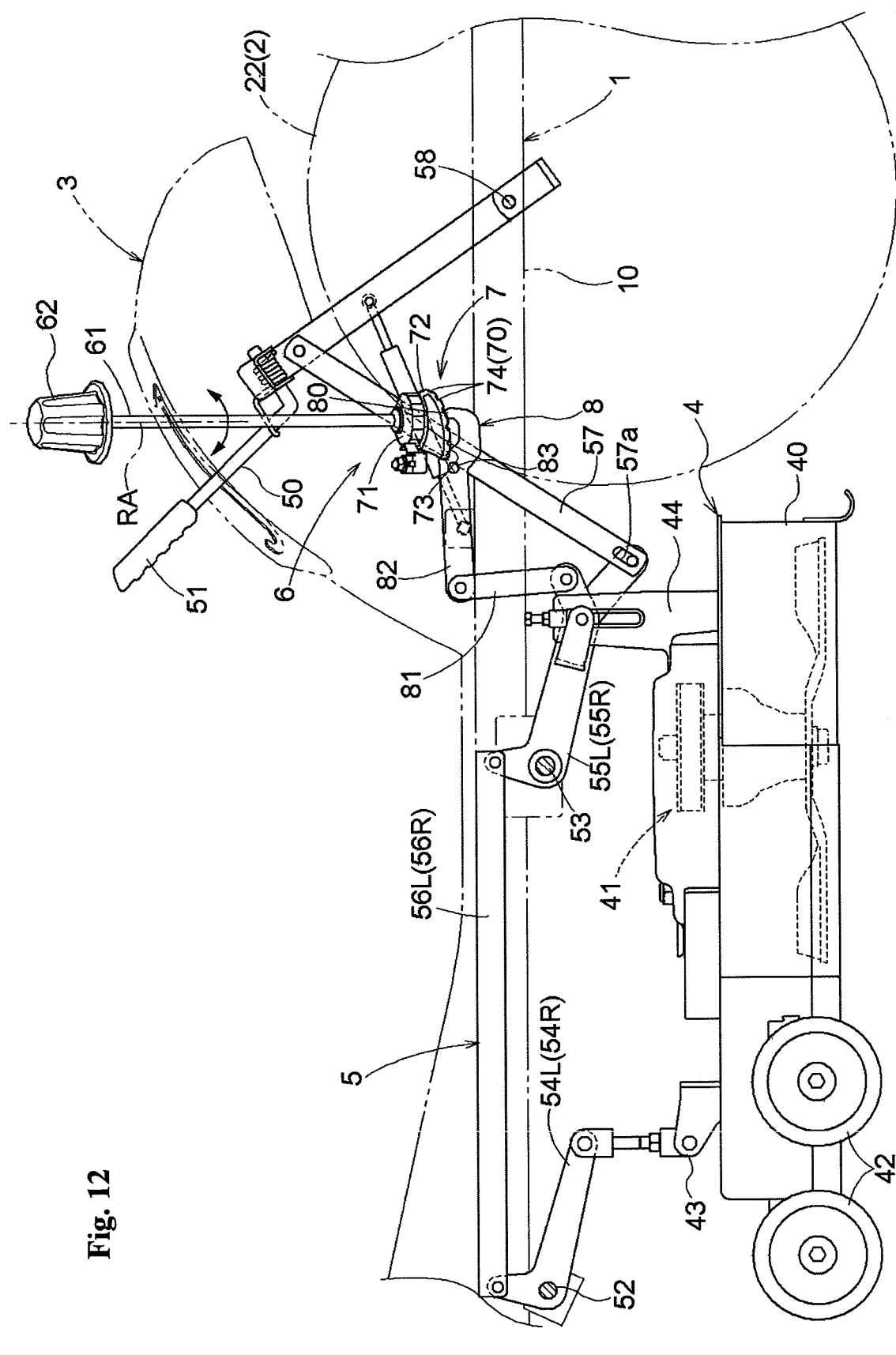
FIG. 12 is a side view showing a state of the lift link mechanism during cutting height adjustment by the cutting height adjustment mechanism.

Next, with reference to FIG. 6 through FIG. 12, the lift link mechanism 5 and the cutting height adjustment mechanism 6 will be explained. FIG. 6 is a perspective view of the cutting height adjustment mechanism 6 and the lift link mechanism. FIG. 7 is a front view of the cutting height adjustment mechanism 6. FIG. 7 shows the cutting height adjustment mechanism as viewed from the front face of the grass mower. FIG. 8 shows a state where the stopper body 8 is engaged with the cam body 7. FIG. 9 shows the plurality of recesses 74 formed by a predetermined pitch in the cam body 7. FIG. 10 shows a state of the lift link mechanism 5 when the mower unit 4 is lowered to the lowest height position. FIG. 11 shows a state of the lift link mechanism 5 when the mower unit 4 is raised to to the highest height position. FIG. 12 shows a state of the lift link mechanism 5 while a cutting height adjustment is being effected by the cutting height adjustment mechanism 6.

The lift link mechanism 5 comprises four-point link type including a pair of left and right short first pivot shafts 52, a second pivot shaft 53 extending along the vehicle body transverse direction between the left and right frames 10 in a region rearwardly of the first pivot shafts 52, a left side first pivot arm 54L operatively associated with the left first pivot shaft 52, a right side first pivot arm 54R operatively associated with the right first pivot shaft 52, a left side second pivot arm 55L and a right side second pivot arm 55R operatively associated with the second pivot shaft 53, a left side connecting link 56L that connects one arm end of the left side first pivot arm 54L with one arm end of the left side second pivot arm 55L and a right side connecting link 56R that connects one arm end of the right side first pivot arm 54R with one arm end of the right side second pivot arm 55R.

The other arm ends respectively of the left side first pivot arm 54L and the right side first pivot arm 54R are connected respectively to a pair of left and right first link brackets 43 attached to the upper face of the mower housing 40. The other arm intermediate portions respectively of the left side second pivot arm 55L and the right side second pivot arm 55R are connected respectively to a pair of left and right second link brackets 44 attached to the upper face of the mower housing 40. These pair of left and right first link brackets 43 and pair of left and right second link brackets 44 form four suspending points relative to the mower housing 40. And, these four suspending points are disposed so as to realize stable suspended posture of the mower housing 40 and the lift link mechanism 5 too is disposed correspondingly.

The other arm end of the left side second pivot arm 55L is link-connected with an intermediate link 57 via a pin inserted to a slot 57a formed at one end of this intermediate link 57. The other end of the intermediate link 57 is link-connected to an intermediate portion of the lift control lever 50. The lift control lever 50 is pivotable about a pivot shaft 58 mounted on the frame 10.

With the above-described configuration of the lift link mechanism 5 in operation, when the lift control lever 50 is pivotally operated downwards, the left side first pivot arm 54L, the right side first pivot arm 54R, the left side second pivot arm 55L and the right side second pivot arm 55R are pivoted, whereby the mower unit 4 is lowered. Conversely, when the lift control lever 50 is pivotally operated upwards, the mower unit 4 is raised.

The stopper body 8 of the cutting height adjustment mechanism 6 is configured as a link mechanism consisting of a first link 81 and a second link 82. The first link 81 is connected to the other arm end of the right side second pivot arm 55R via a link pin. One end of the second link 82 is pivotally supported as a seesaw arm to the frame 10 to be pivotable about a lateral axis. One end of the second link 82 is connected via a link pin to the other end of the first link 81. At the other end of the second link 82, there is formed an acting portion 80 which can come into selective contact with the recesses 74 as a plurality of contact faces 70 of the cam body 7. As the acting portion 80 of the second link 82 comes into contact with one of the recesses 74 of the cam body 7, a movement of the lift link mechanism 5 in the lowering direction is limited. That is, by means of the recess 74 with which the acting portion 80 of the second link 82 comes into contact, a cutting height which is a height position of the mower unit 4 is adjusted.

FIGS. 7 through 9 show the cam body 7 of the cutting height adjustment mechanism 6 in details. This cam body 7 is basically identical to the one explained above with reference to FIG. 1 and FIG. 2 and consists essentially of a top wall 71 attached to the lower end of the rotational rod 71 and a conically shaped side wall 72 extending in the form of a skirt from the top wall 71. The rotational rod 61, the top wall 71 and the side wall 72 are located on a same axis of the rotational axis RA which is sloped by about 20 degrees relative to the perpendicular axis. Further, since the conically shaped side wall 72 is sloped with the angle: α=about 20 degrees relative to the rotational axis RA, as shown in FIG. 7, the perpendicular line extending through the recess 74 in contact with the acting portion 80 of the second link 32 which constitutes the cam body 8 extends along the side wall 72. The bottom face 73 of the side wall 72 is formed spiral along the rotational axis RA, so that a length from the top wall 71 to the bottom face 73 of the side wall 72 (generating line length) varies along the circumferential direction. In the bottom face 73, the semi-circular recesses 74 are provided by a predetermined pith as the contact faces 70. By rotating the rotational rod 61, one recess 74 to come into contact with the acting portion 80 of the stopper body 8 can be selected. As the recesses 44 are arranged in a spiral form along the rotational axis RA, in response to rotation of the stopper body 8 in one direction, the cutting height becomes higher; and in response to rotation of the stopper body 8 in the other direction, the cutting height becomes lower.

Since the stopper body 8 is disposed such that the acting portion 80 may be located downwardly of a position where the cross sectional face of the side wall 72 extends substantially along the perpendicular line, the generating line of the side wall 72 extending through the recess 74 coming into contact with the acting portion 80 becomes a substantially perpendicular line. A line of force action (denoted by an arrow in FIG. 2) at the time of contact between the cam body 7 and the stopper body 8 (at the time of contact between the acting portion 80 and the recess 74) extends substantially along the perpendicular line. This line of force action acting between the cam body 7 and the stopper body 8 will remain unchanged and will extend substantially along the perpendicular line even when the recess 74 with which the acting portion 80 comes into contact with rotation of the cam body 7 is varied, that is, even when the cutting height is varied.

As shown in FIG. 5 and FIG. 6, the support bracket 76 which pivotally supports the lower end of the rotational rod 61 is attached to the frame 10. This support bracket 76 comprises a plate member bent into a portal shape and its leg portion 761 is welded to an upper portion of the frame 10. Further, the rotational rod 61 is inserted into a through hole provided at an upper portion 762 of the support bracket 76 and pivotally supported by means of a bush or the like. The cam body 7 is accommodated within an inner space of the support bracket 76. With this, the support bracket 76 functions also as a cover for the cam body 7. The support bracket 76 further includes a tongue piece for supporting a support pin 83 which acts as a pivot shaft for the second link 82.

OTHER EMBODIMENTS (1) In the foregoing embodiment, the cutting height control grip 62 is disposed on the left side of the driver's seat 11 and the lift control lever 50 is disposed on the right side of the driver's seat 11. But, these can be disposed in reverse. Further, both the cutting height control grip 62 and the lift control lever 50 can be disposed on either one side of the driver's seat 11.

(2) In the foregoing embodiment, the rotational rod 61 of the cutting height adjustment mechanism 6 is sloped only in the vehicle body transverse direction. Alternatively, this rod 61 can be sloped in the vehicle body front-rear direction also or can be sloped only in the vehicle body front-rear direction, in order to realize optimum layout of the cutting height control grip 62 and the cam body 7.

(3) Rather than the semi-circular recess 74, the shape of the contact face 70 can be selected as desired as long as such other shape too can receive the acting portion 80 of the stopper body 8.

(4) The foregoing embodiment relates to a steering wheel type grass mower. However, the invention can be applied to a so-called zero-turn mower configured such that left and right wheels can be controlled independently by a pair of left and right control levers. The present invention is applicable to any grass mower which varies a cutting height through adjustment of a ground-height of a mower unit.

DESCRIPTION OF REFERENCE MARKS/NUMERALS

1: traveling vehicle body
10: frame
11: driver's seat
12: steering wheel
13: engine
14: PTO transmission mechanism
15: hood
16: panel body
16a: meter panel
16b: steering post cover
2: wheel unit
21: front wheel
22: rear wheel
3: fender unit
30: floor panel
301: left footrest portion
302: right footrest portion
31: left rear wheel fender portion
32: right rear wheel fender portion
33: seat attaching portion
35: brake pedal
36: forward traveling speed setting pedal
37: reverse traveling speed setting pedal
4: mower unit
40: mower housing
41: blade drive unit
42: ground contacting gauge wheel
43: first link bracket
44: second link bracket
5: lift link mechanism
50: lift control lever
51: lift control grip
52: first pivot shaft
53: second pivot shaft
54L: left side first pivot shaft
54R: right side first pivot shaft
55L: left side second pivot arm
55R: right side second pivot arm
56L: left side connecting link
56R: right side connecting link
57: intermediate link
57a: slot
58: pivot shaft
6: cutting height adjustment mechanism
61: rotational rod
62: cutting height control grip
7: cam body
70: contact face
71: top wall
72: side wall
73: bottom face
74: recess
76: support bracket
761: leg portion
762: upper portion
8: stopper body
80: acting portion
81: first link
82: second link
83: support pin
CL: vehicle body front-rear direction centerline
RA: rotational axis

The invention claimed is:

1. A grass mower comprising:
a traveling vehicle body;
a mower unit;
a driver's seat disposed at a center in a transverse direction of the vehicle body and at an upper portion of the vehicle body;
a fender unit including a left fender, a right fender and a seat attaching portion;
a lift link mechanism supporting the mower unit downwardly of the traveling vehicle body with allowing raising and lowering of the mower unit; and
a cutting height adjustment mechanism for adjusting a cutting height of the mower unit by the lift link mechanism;
the cutting height adjustment mechanism including:
a cutting height control grip disposed upwardly of the fender unit and on one outer side of the driver's seat in the vehicle body transverse direction;
a cam body disposed downwardly of the fender unit and closer to a center of the vehicle body in the vehicle body transverse direction than the cutting height control grip;
a rotational rod extending obliquely through the fender unit and connecting the cutting height control grip with the cam body; and
a stopper body for selectively determining a cutting height of the mower unit in association as it comes into contact through an acting portion with one of a plurality of contact faces formed in the cam body,
wherein a slope angle (a) of the center axes of the rotational rod and the cam body are determined such that a force action line between the cam body and stopper body is in a perpendicular direction,
the cam body is in the shape of a cup-shaped cone and the force action line is established whichever contact face is in contact with the acting portion of the stopper body
the plurality of contact faces are formed in a bottom circumference face of the cone, and an extending direction of a generating line of the cone extending through a contact point between the respective contact face and the stopper body is in alignment with an extending direction of a force action line between the contact face and the stopper body, and
the extending direction of the force action line comprises a perpendicular direction, and the rotational rod extends with a slope relative to the perpendicular line by an angle formed between a center axis of the cone and the generating line.

2. The grass mower according to claim 1, wherein the traveling vehicle body includes a pair of left and right frames which extend along a vehicle body front-rear direction and which are interconnected via a cross beam, and the cam body is overlapped with the frame as seen in a plane view.

3. The grass mower according to claim 2, wherein a support bracket which pivotally supports the cam body and also supports the stopper body with allowing displacement thereof is attached to the frames.

4. The grass mower according to claim 3, wherein the cam body is covered at least partially by the support bracket.

5. The grass mower according to claim 1, wherein a lift control lever for lifting up/down the mower unit via the lift link mechanism is disposed on the other outer side of the driver's seat in the vehicle body transverse direction.

6. The grass mower according to claim 5, wherein a control grip is provided at an upper end of the lift control lever; and at a home position for maximally lifting up the mower unit, the control grip is located at a same height as the cutting height control grip.

7. The grass mower according to claim 6, wherein the control grip and the cutting height control grip are disposed in left-right symmetry relative to the driver's seat.

* * * * *

UNITED STATES PATENT AND TRADEMARK OFFICE
CERTIFICATE OF CORRECTION

PATENT NO. : 10,645,873 B2
APPLICATION NO. : 14/960829
DATED : May 12, 2020
INVENTOR(S) : Reichard Page 1 of 1

It is certified that error appears in the above-identified patent and that said Letters Patent is hereby corrected as shown below:

In the Claims

Column 10, Line 38 (Claim 1, Lines 36, 37) please change "body the" to -- body, the --

Signed and Sealed this
Fifteenth Day of December, 2020

Andrei Iancu
*Director of the United States Patent and Trademark Office*